United States Patent [19]

Gallizia

[11] 4,329,133
[45] May 11, 1982

[54] FLAT EXTRUDER HEAD

[75] Inventor: Achille Gallizia, Milan, Italy

[73] Assignee: Industrie Pirelli S.p.A., Milan, Italy

[21] Appl. No.: 197,061

[22] Filed: Oct. 15, 1980

[30] Foreign Application Priority Data

Oct. 17, 1979 [IT] Italy ............................... 26543 A/79

[51] Int. Cl.³ .............................................. B29F 3/04
[52] U.S. Cl. .................................. 425/114; 425/131.1;
425/133.5; 425/141; 425/192 R; 425/376 A;
425/381; 425/461; 425/462; 425/466; 425/467
[58] Field of Search ................... 425/114, 462, 376 A,
425/133.5, 466–467, 131.1, 113, 141, 382 R,
461, 381, 192 R; 264/171, 40.7

[56] References Cited

U.S. PATENT DOCUMENTS 2,813,301 11/1957 Underwood ........................ 425/466
3,323,172 6/1967 Pierson et al. .................. 425/376 A
3,474,495 10/1966 Duetsch et al. ...................... 425/113
3,616,496 11/1971 Anglioletti et al. ................. 425/113
3,737,262 6/1973 Klein .................................. 425/113
3,912,436 10/1975 Bailly ................................. 425/113
4,150,929 4/1979 Brandt ............................... 425/114

Primary Examiner—Jeffery R. Thurlow
Attorney, Agent, or Firm—Stevens, Davis, Miller & Mosher

[57] ABSTRACT

An extruder head for extruding an elastomeric composition to form a reinforced elastomer article such as a conveyor belt has a substantially rectangular die opening and a guide member disposed in the opening of the die for directing the reinforcing elements into the composition as it is shaped by the die.

A device is provided for restricting the streams of composition, which flow on opposite sides of the guide member, to have said flow meet said reinforcement along two parallel fronts.

7 Claims, 6 Drawing Figures

FLAT EXTRUDER HEAD

This invention relates generally to an apparatus for shaping an elastomeric composition or the like to form an elongated substantially flat belt having reinforcing elements embedded therein and, more particularly, to an extrusion head for shaping an elastomeric composition or the like into a flat band having a metallic or non-metallic longitudinal resistant insert member embedded therein such as, for example, an endless conveyor belt.

The extruder head provided by the invention may be used for the manufacture of any elongated article which is substantially rectangular in cross-section and has reinforcing members embedded therein to resist stretching of the article longitudinally such as endless belts including conveyor belts, rubber sheets and the like. The substantially completely embedded reinforcing insert member may be metallic or non-metallic cords or it may be a woven metallic or non-metallic fabric, other web-like member or other two-dimensional structure.

Flat extruder heads adapted to make elastomeric belts or the like provided with a longitudinally disposed reinforcing member embedded therein have been disclosed before. These known extruder heads shape the shapeable composition and embed or enclose a longitudinally disposed reinforcing insert member therein.

The heretofore available extruder heads for making reinforced elongated flat articles have numerous disadvantages, however, such as being adapted only to produce acceptable articles from a specific type of elastomeric composition thus requiring a different extruder head for each type of composition to be extruded to insure the production of an article which has a uniform predetermined thickness. In the prior art devices it is necessary for the conduits through which the elastomeric composition flows from the outlet of the extruder to the extruder head to be varied in shape depending upon the particular composition to be extruded to guarantee load losses which permit uniform outflow of the composition from the mouth of the extrusion head. These load losses are dependent upon various properties of the composition such as viscosity.

The limitation of the extruder head for use with only one type of composition is particularly pronounced with extruder heads for extruding a composition to form a flat article of large dimensions such as conveyor belts. The conduits of apparatus for making such large articles often are very long. The ability of such apparatus to extrude only one type of composition is becoming more and more of a problem because of the increasing demand for conveyor belts of large widths and with resistance to higher temperatures, improved flame resistance and improved resistance to abrasion. In order for the belt to have such characteristics it is necessary to include additives in the composition which have an effect, usually an adverse effect, on the characteristics such as viscosity of the composition.

Because of the necessity to manufacture conveyor belts with different compositions, best results can be obtained only with certain compositions while the thickness of the product prepared from other compositions varies excessively. In fact, if a known flat extruder head extrudes a composition having very different characteristics from those for which it has been designed, assuming that one can succeed in making the composition issue from the mouth of the flat head, the flow of composition from the mouth of the extruder is not uniform. As a consequence of this, single cords, which constitute the resistant insert, are stressed in different amounts and are not aligned in the conveyor belt as planned, or they are under tension with a loss of the desired characteristics in the finished product. In order to guarantee exact alignment, positioning and the correct tension on the longitudinal resistant insert inside the finished article, it is necessary for the elastomeric composition to be charged to the zone where the resistant insert is embedded in the elastomeric composition at a substantially uniform flow rate.

An object of the present invention is to overcome the drawbacks of the known extruder heads for extruding articles having resistant insert members embedded in an elastomeric composition, and in particular, to provide an extruder head for extruding a plurality of compositions, which is adapted to extrude articles of a very large width and which can replace other machines used for embedding reinforcing elements in a body of an elastomeric composition such as, for example, calenders, but with a much greater accuracy, in particular with regard to the thickness of the sheets thus produced.

Another object of the invention is to provide an extruder head having a die opening for shaping an extrudable composition into elongated flat articles such as conveyor belts having reinforcing members embedded therein which resist stretching and deformation of the article.

Other objects will become apparent from the following description with reference to the accompanying drawings wherein.

In its broader aspects, the invention contemplates a flat extruder head for manufacturing elastomeric articles having a reinforcing insert member embedded therein, comprising a guide element, inside of which slides the reinforcing insert member, placed on opposite sides with respect to the guide element, an upper body member and a lower body member, each one of said body members being provided with a mobile gauge for regulating the thickness of the elastomeric article, placed adjacent to the exit zone of the reinforcing insert from the guide element where the reinforcing element becomes embedded in the elastomeric composition, a conduit on their inside perpendicular to the direction of extrusion, within which the elastomeric composition flows, and a continuous slot provided with restricting means for feeding the zone where the reinforcing insert is embedded from said conduit.

Figure 1:
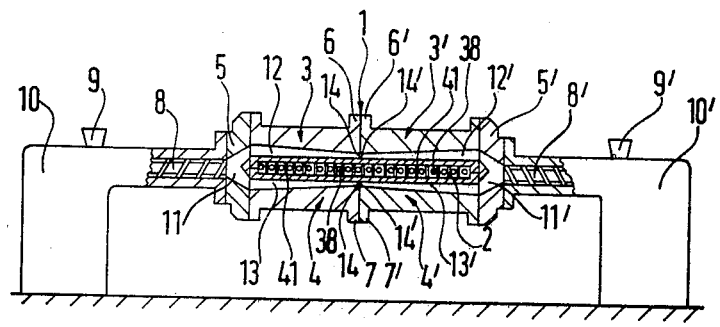
FIG. 1 shows schematically one embodiment of an extruder head provided by the present invention for extrusion of flat articles seen from the exit side of the extruded article.

In FIG. 1, there is shown schematically and partially in cross-section, one embodiment of an extruder head 1 provided by the invention. The flat extruder head 1 is particularly advantageous for extruding an elastomeric composition to form a conveyor belt having a longitudinal reinforcing insert member of metallic cords embedded therein.

Flat extruder head 1 is provided with a wire guide element 2 for assisting in locating the reinforcing member in the resulting belt. The metallic cords slide within and are guided by guide member 2.

On one side of wire guide member 2, there is present an upper body divided into two halves 3 and 3'; while on the other side of wire guide 2, a lower body member is divided into two halves 4 and 4'.

The internal structure of member 3,3' and of member 4,4', shall be described with reference to FIG. 2. At the lateral extremities of the flat extruder head 1, are disposed two lateral elements 5 and 5' that limit the flat extruder head 1 laterally and have moreover, the function of joining together the extremities of the two halves 3,3' and 4,4' of the upper and lower bodies.

The two halves 3 and 3' of the upper body member, and the two halves 4 and 4' of the lower body member, are fixed together by two upper flanges 6 and 6' and by two lower flanges 7 and 7', respectively, which are connected to each other by bolts (in FIG. 1 only the outline of their axes are indicated). Screw extruder barrels 8 and 8' are disposed on opposite sides of flat extruder head 1. Each extruder 8 and 8' is provided with a hopper 9 and 9' for charging elastomeric material associated with a source of elastomeric composition which is not shown in the drawing. The source of elastomeric composition may be in the form of strips fed from a device known per se. Motor, command, control and synchronization units of a conventional type are enclosed in housings 10 and 10', respectively for each extruder 8 and 8'.

The exit mouth of each extruder 8 and 8' is connected to a split-flow conduit 11 and 11', respectively.

The split-flow conduit 11 communicates with one-half 12 of the upper conduit and with one-half 13 of the lower conduit, while the split-flow conduit 11' communicates with the other one-half 12' of the upper conduit and with the other one-half 13' of the lower conduit. The two halves 12 and 12' of the upper conduit and the two halves 13 and 13' of the lower conduit, are provided respectively in the two halves 3 and 3' of the upper body member, and in the two halves 4 and 4' of the lower body member. Both the upper conduit, as well as the lower conduit, have their axis substantially perpendicular to the direction of extrusion. Moreover, as can easily be seen from FIG. 1, the two halves 12 and 12' of the upper conduit and the two halves 13 and 13' of the lower conduit have their sections tapered inwardly towards the center line, i.e., decrease as the distance increases from the extruder 8 and 8'. Moreover, the two halves 12 and 12' of the upper conduit and the two halves 13 and 13' of the lower conduit are provided with shaped members 14 and 14' respectively, for facilitating the flow of the elastomeric composition into the section where the two body member halves 3 and 3' of the upper body member and the two body member halves 4 and 4' of the lower body member are joined together.

A baffle (not shown in the figures) of a suitable form, that physically divides one from the other of the two halves 12 and 12' of the upper conduit, as well as the two halves 13 and 13' of the lower conduit may be provided in each section.

As can easily be understood from the preceding description, and can be seem from FIG. 1, the flat extruder head 1 of the present invention, can be divided into two parts that are perfectly symmetrical and also independent of each other, as far as the feeding of the elastomeric composition is concerned. The right half, for an observer looking at FIG. 1 (i.e. from flanges 6' and 7' to the casing 10'), has been indicated by numbers that are primed; whereas the left half (i.e. from the flanges 6 and 7 to the casing 10), has been indicated by numbers that are not primed.

Figure 2:
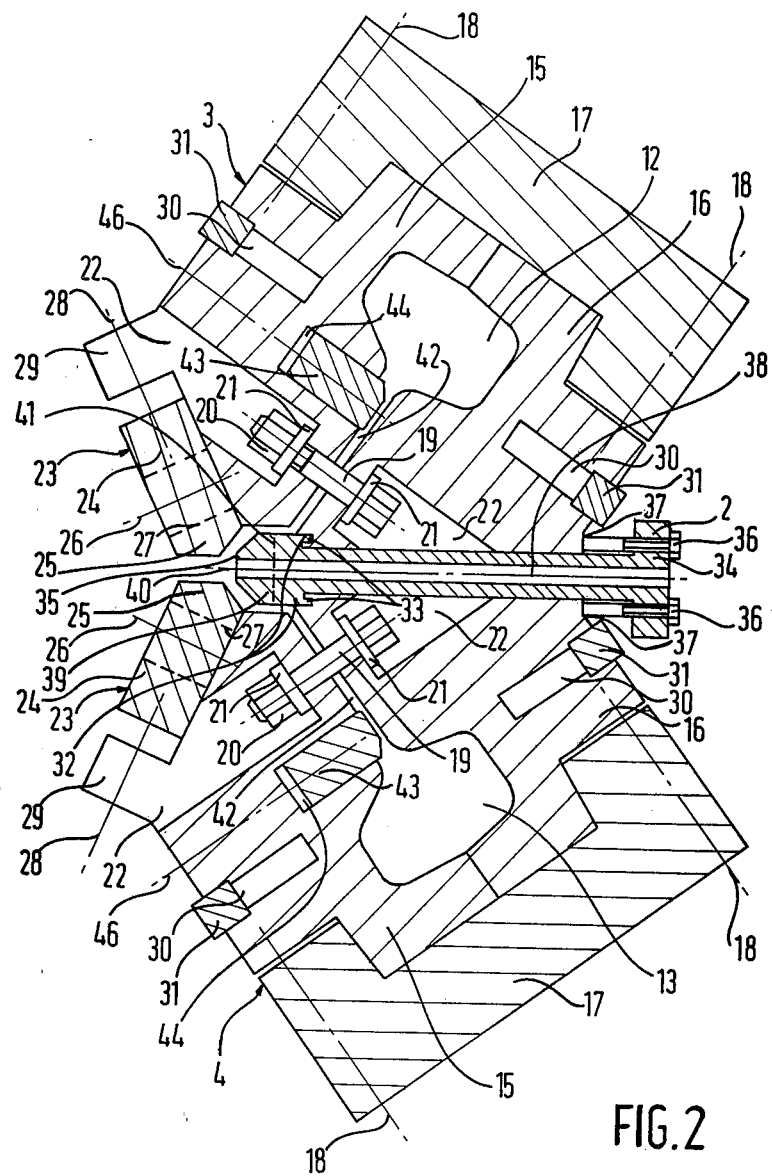
FIG. 2 is a cross-section, taken along a vertical plane parallel to the advancing end of the extruded article, of the extruder head provided by the present invention.

FIG. 2 shows a cross-section of the flat extruder head 1, sectional along a vertical plane disposed according to the direction of extrusion of the conveyor belt. As can be seen from FIG. 2, the structures of the upper body and the lower body are the same, and therefore, in the following description, the same elements of each of the body members 11 will be indicated with the same reference numerals. The structure of upper body member 3 and of the lower body member 4, comprises two half-bodies 15 and 16 that are joined together by a cap 17 for the entire width of the flat extruder head 1, for example, screwed to each of said half-bodies through bolts, the axis of which is indicated by the reference numeral 18 in FIG. 2. For preventing any opening of the two half-bodies 15 and 16 under the action of the elastomeric composition during extrusion, the two half-bodies are moreover connected to each other by means of a plurality of tie-rods which in the embodiment of FIG. 2 are a plurality of bolts 19 and nuts 20, provided with appropriate washers 21 for preventing their rotation and also for increasing their supporting base.

Bolts 19 and nuts 20 are inserted into appropriate holes 22 made in the two half-body members 15 and 16. Each half-body member 15 is moreover provided with a gauge 23 for regulating the thickness of the conveyor belt that is extruded.

Gauge 23, comprise a plurality of knives 24, placed one adjacent to the other. Each knife 24 has a shaped extremity 25 that determines the thickness of the conveyor belt that is being extruded. Knives 24 are connected to the half-body member 15, for example, by means of bolts 26 (only their axes are shown), the shanks of which are inserted into slits 27 (outlined with dashes in FIG. 2), present on knives 24 for allowing the movement with respect to bolts 26. Said movement is regulated through suitable screws 28 (only their axes are indicated in the drawing) that are connected to a bracket 29 projecting from the half-body member 15. Each of half-body member 15 and 16 is provided moreover with a passage 30, closed by a cover 31, in which can circulate a suitable fluid, such as, for example, water for maintaining the elastomeric composition flowing within the conduits 12 and 13, at a desired temperature.

For guaranteeing a further connection between the two half-body members 16, i.e., the upper and the lower members, a step 32 is provided on each side of the wire guide member 2 in a preferred embodiment.

Step 32 is inserted into a groove 33 that is present on each half-body member 16. To allow step 32 to become blocked, by becoming inserted within the groove 33, an enlargement 34 is provided at the end of the wire guide member 2, into which are inserted the metallic cords that form the longitudinal resistant insert member of the conveyor belt. Enlargement 34 is provided with a plurality of threaded through-holes into which are inserted screws 36 that, with their extremity 37, push against the half-body members, thus guaranteeing a fixed joint between step 32 and groove 33. Wire guide 2 is, moreover, provided with a plurality of through-holes 38, parallel and coplanar one to the other, that act as a guide for the metallic cords. Metallic cords issue from the exit holes 35 of wire guide member 2, into zone 40 defined by the shaped end 25 of the gauges 23 and by the tapered end 39 of the wire guide member 2.

In zone 40, the composition flows and cords are embedded into the composition. For facilitating embedding of the cords in the composition, vertical slits 41 (see dashed vertial line of FIG. 2) are provided at the exit extremity of the wire guide member 2, alternated with the through-holes 38. Vertical slits 41 and the exit holes 35 of the through-holes 38, can also be seen in FIG. 1. The path followed by the composition flowing within the conduits 12 and 13 to feed the zone 40 where the metallic cords are embedded within the elastomeric material constituting the body of the conveyor belt can be seen in FIG. 2. The path comprises a continuous slot 42 having at first a rectilineal development, inclined with respect to the extrusion direction, then a short segment parallel to the extrusion direction before flowing into zone 40 where the metallic cords are embedded therein. Continuous slots 42, present in both the upper body member and the lower body member, are each contained in a single plane, inclined with respect to the advancing direction of the extruded element and the two planes containing the continuous slot intersect along a line which meets all the axes of the through-holes 38 of the wire guide member 2. Continuous slots 42 are only interrupted by the shanks of the bolts 19 that connect together the two half-body members 15 and 16. At the beginning of slots 42, i.e., in proximity of the respective conduits 12 and 13, are present means for restricting the flow of the elastomeric composition into said slots.

Figure 3A:
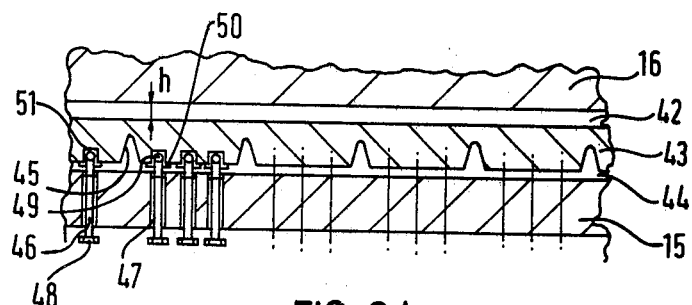
FIG. 3 is a partial cross-sectional of a portion of one embodiment of a device for restricting the stream of composition associated with the flat extruder head according to the present invention, in an undeformed position (A), and in a deformed position (B)
Figure 3B:
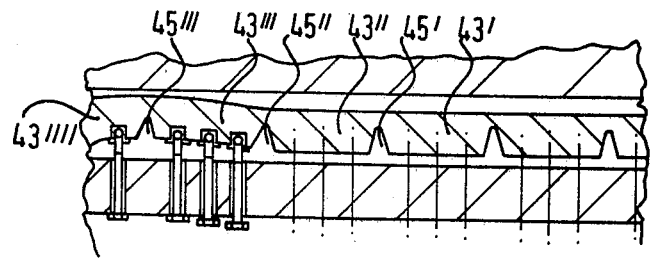

The restricting means extend throughout the entire width of the continuous slot 42, and they can modify the restriction of the flow from point to point. By width of the slot 42, is intended in the present invention the dimension of the slot itself taken parallel to the line where the two planes containing the slots intersect. This dimension is perpendicular to the plane of the section represented in FIG. 2. A particular embodiment, according to the present invention of said restricting means comprises a prismatic continuous bar 43, housed in a cavity 44. Cavity 44 is substantially perpendicular to continuous slot 42. Continuous prismatic bar 43 is provided with transverse incisions 45 (see FIG. 3) distributed in a uniform manner along the larger dimension of continuous prismatic bar 43 to give elastically to the bar.

Transverse incisions 45 have preferably the form of a 'V' with its apex rounded-off. The dividing means comprise moreover, conventional means operated from the outside and connected to the side of the bar provided with incisions 45.

The means (see FIG. 3) are preferably screws 46 (only four of them are shown in the figure—for the others there is only indicated the axis which is also indicated in FIG. 2 with the reference numeral 46) associated to threaded holes 47 present in the half-body member 15.

Screws 46 have on their extremity placed outside the half-body member 15, an appropriate head 48 for rotating them, while the opposite end is provided with a spherical head 49 blocked by means of a small slab 50 joined to prismatic bar 43 by conventional means such as screws or welding, in a hole 50' present on prismatic bar 43.

An alternative embodiment for restricting the flow of the elastomeric composition comprises a plurality of independent prismatic elements, one adjacent to the other. The prismatic elements are inserted into a cavity that is similar to the cavity 44 previously described and each of the prismatic elements is provided with means that are operable from the outside to regulate both their translatory, as well as their oscillatory motions, obviously only for small oscillations with respect to the cavity. Said means can be similar to the screws 48 described in the treatment of FIG. 3. In substance, each of the prismatic elements is equivalent to the portion of prismatic bar 43 described previously, between two adjacent incisions 45.

Figure 5:
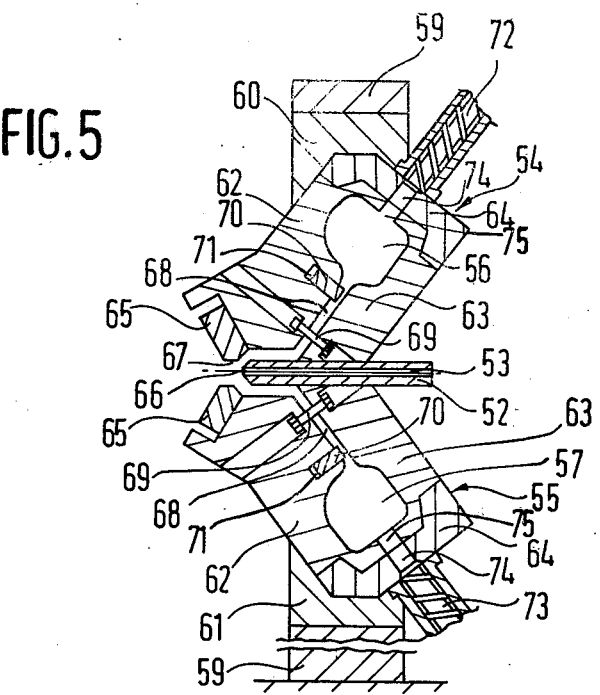
FIG. 5 shows a schematic cross-section, taken in a vertical plane parallel to the direction of advancement of the extruded article, of the alternative embodiment, represented in FIG. 4.
Figure 4:
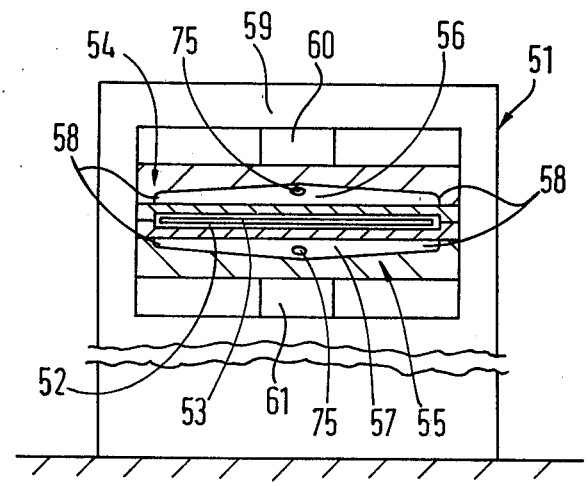
FIG. 4 shows schematically, an alternative embodiment of a flat extruder head according to the present invention, seen from the exit side of the extruded article.

An alternative embodiment of a flat extruder of the present invention, is shown in FIGS. 4 and 5. FIG. 4 shows schematically and partially in cross-section, the alternative embodiment of flat extruder head 51, seen from the front, i.e., from the exit side of the extruded article, while FIG. 5 illustrates schematically a section of flat extruder head 51 taken with a vertical plane parallel to the advancing direction of the extruded article. The structure of the flat extruder head 51 represented in particular in FIG. 5, is the same as the structure of the flat extruder head 1 represented in FIG. 2 so reference can be made to FIG. 2 for details of the structure while in FIG. 5 are schematically indicated only the main parts of the flat extruder head 51. Flat extruder head 51 is particularly suitable for embedding a fabric, or a two-dimensional reinforcement structure in an elastomeric mass, and it comprises a guide element 52 for the resistant insert member to be embedded, provided with a continuous opening 53 inside which slides and is guided the fabric before it is embedded in the elastomeric mass. From each side, with respect to the guide element 52, there is present an upper body member 54 and a lower body member 55.

Inside upper body member 54 and lower body member 55, there are present two conduits 56 and 57 respectively, substantially perpendicular to the advancing direction of the extruded article and having tapered ends 58. The cross-section of both conduits diminishes uniformly from the central section to the tapered extremity 58. Since guide element 52 is weakened by the presence of the continuous opening 53, there is provided a strengthening frame 59 all around the flat extruder head 51. The two bodies, upper body member 54 and lower body member 55, are laterally joined to frame 59 and, moreover, two blocks 60 and 61 act as an intermediary connection between frame 59 and, respectively, the upper body member 54 and the lower body member 55, for preventing any eventual deformations due to the pressure of the extruded composition during operation. FIG. 5 shows schematically, a cross-section of flat extruder head 51. In FIG. 5 can be seen how the structure of the upper body member 54 and that of the lower body member 55 are equal, and hence, the same particulars of the two body members will be indicated by the same number. Each of body members 54 and 55 is provided with a half-body 62 and a half-body 63 connected to each other for the entire width of the flat extruder head 51 by means of a cap 64. Each half-body 62 is provided moreover, with a gauge 65 similar to gauge 23 previously described in the treatment of FIG. 2. Gauge 65, together with the exit extremity 66 of the guide element 52, define the embedding zone 67 of the fabric inside the elastomeric mass.

The elastomeric composition in flowing respectively from conduit 56 or from conduit 57 to the embedding zone 67, flows through a continuous slot 68 having the same characteristics as those of the continuous slot 42 described with respect to FIG. 2. Continuous slots 68 are interrupted by the shanks of a plurality of bolts 69 that connect together the half-bodies 62 and 63, respectively. Moreover, continuous slots 68 are provided with restricting means 70 placed preferably in proximity of conduits 56 and 57. The restricting means 70, can have the structure of either of the two embodiments described previously, i.e., either with one continuous prismatic bar provided with incisions or with a plurality of independent prismatic elements. The means are disposed in a cavity 71 having the same characteristics as the cavity 44 described with respect to FIG. 2, and are operated by conventional means, such as, for example, screws 46 described in FIG. 3, from the outside of each half-body 62. The fundamental difference between the flat extruder head 51 and the flat extruder head 1 lies, apart from the different form of guide element 52 and of wire guide 2, and in the presence of the frame 59 associated only with flat extruder head 51, in the different positions of the extruders which feed the conduits present within the upper and lower bodies. In fact, conduits 56 and 57 are each fed respectively by an extruder 72 and 73. In particular, an extruder 72 feeds conduit 56 through a hole 74 present in the cap 64 placed exactly halfway along the width of the flat extruder head 51, i.e., hole 74 opens, with its own exiting section 75, into the conduit 56 in correspondence of its greater section (see also FIG. 4, in which the extruder 72 and the extruder 73 are not visible, since they are placed behind blocks 60 and 61, respectively). The other extruder 73 feeds conduit 57 through a hole 74 passing through cap 64, and opens with its own exit section 75 into conduit 57 in correspondence of its greater section (see FIG. 4). Both extruders 72 and 73, are provided with conventional motorization, synchronization, command and control units (not shown in the figures) and with an appropriate device for feeding the elastomeric material (also not shown).

An alternative embodiment of a flat extruder head, according to the present invention, of the type for extruding an elastomeric mass provided with a longitudinal resistant insert and in particular for extruded articles having a limited width, provides for the flat extruder head to be fed by a single extruder placed laterally to the flat extruder head.

A further alternative embodiment of the flat extruder head for extruding an elastomeric mass provided with a longitudinal resistant insert, has a pair of conduits 12-12' and 13-13' fed from a single extruder associated respectively to the upper bodies 3-3' and to the lower bodies 4-4'. Each of the extruders feed either the pair of conduits 12-12' or the pair of conduits 13-13' through a hole placed in the section connecting the pairs of conduits.

The pairs of conduits 12-12' and 13-13' must be tapered in such a way as to have their greater section in correspondence of the extruders.

Another alternative embodiment of a flat extruder head of the invention, of the type for embedding a fabric in an elastomeric mass, has feeding extruders placed laterally to the flat extruder head, one on each side, and each of these extruders feeds in parallel, the half of the upper conduit and the half of the lower conduit that are adjacent to the extruder, the upper and lower conduits must be tapered in such a way as to present their greater section in the proximity of the extruders.

Finally, a further alternative embodiment of the present invention of a flat extruder head of the type for embedding into an elastomeric mass a resistant insert constituted by a plurality of longitudinal cords or by a fabric has several flat extruder heads, placed one adjacent to the other, so as to be able to extrude all together, articles having unlimited widths, and/or several flat extruder heads of the type for embedding a fabric or a plurality of cords in an elastomeric mass, are placed in series to each other, in the advancing direction of the extruded article so as to be able to consecutively extrude upon the article, several layers of elastomeric material, even of different types, or to be able to embed in the extruded article, several resistant inserts which may be of different types.

The operation of a flat extruder head according to the present invention, will be described with reference to FIGS. 1, 2 and 3, intending that the same principle of functioning is also performed by the flat extruder head described and illustrated in FIGS. 4 and 5 and for all the other embodiments previously described.

The elastomeric composition from which the body of the conveyor belt is extruded through the flat extruder head 1, is made to flow from two screw extruders 8 and 8' into the two split-flow conduits 11 and 11' respectively, and from there continues into the upper conduit and into the lower conduit. In particular, from the split-flow conduit 11, the compound will flow into the half 12 of the upper conduit and into the half 13 of the lower conduit, while from the split-flow conduit 11', the compound will flow into the half 12' of the upper conduit and of the half 13' of the lower conduit. The four fronts of advancement of the compound move forward until they meet in proximity of shaped members 14 and 14' of the upper conduit and of the lower conduit respectively. At this point, with the mixture having completely filled both the upper and the lower conduits, it will start flowing into the two slots 42, where it immediately comes into contact with the restricting means in the form of the continuous prismatic bar 43 placed inside the continuous cavity 44. Prismatic bar 43 has been previously regulated before the starting of the extruders, depending upon the type of composition to be extruded on the basis of previous experiences and tests carried out. For example, for a mixture having the following composition:

| | |
|---|---|
| NATURAL RUBBER | 100 parts by weight |
| ZINC OXIDE | 5 parts by weight |
| SULPHUR | 5 parts by weight |
| CBS (N-cyclohesyl-2-benzothiazole sulfenamide) | 0.7 parts by weight |
| STEARIC ACID | 1 parts by weight |
| ANTI-OXIDANTS (polymerized 1,2-dihydro-2,2,4-trimethylquinoline) | 1 parts by weight |
| CARBON BLACK HAF | 45 parts by weight |
| PRECIPITATE OF SILICON DIOXIDE (Hi-Sil 233 Registered Trade Mark of PPG Industries) | 15 parts by weight |
| RESORCIN | 2.5 parts by weight |

| | |
|---|---|
| HEXAMETYLENETETRAMINE | 1.5 parts by weight |
| NAPHTHENIC OIL | 4 parts by weight | having a pressure at the exit of the extruder of 150–250 atmospheres, with pressure in correspondence of the shaped members 14 and 14' of 20–50 atmospheres and with a width of the flat extruder head 1 of 1.3 meters, the continuous prismatic bar 43 is regulated in such a way as to leave a height (h) of 0.5 mm (see FIG. 3) between the bar 43 and the surface of the half-body 16 that defines the slot 42 in the slot portion that is nearest the extruder 8. Height (h) will uniformly increase until a height of 3 mm in correspondence of half the width of the flat extruder head 1, to then diminish gradually to the height of 0.5 in correspondence of the slot portion 42 nearest to the extruder 8'. This regulation of the continuous prismatic bar 43 is the same, both for the bar present in the upper body, as well as for that present in the lower body. In this way, the pressure of the front of advancement is regulated for the compound along both the slots 42. In this way, the uniformity of the pressure along the entire front of advancement of the mixture inside the two slots 42 is obtained.

The front of advancement will be, as a consequence, parallel for the entire width of the slots 42.

Continuous prismatic bar 43, is regulated through suitable rotation of the ends 48 of screw 46 that, being associated to the threaded holes 47 fixed with respect to the half-body 15, move inside or outside of holes 47 so as to move the prismatic bars 43 with respect to the continuous cavity 44, varying more or less, the height (h) defined hereabove. Prismatic bar 43, can thus become deformed with continuity, thanks to the transverse incisions 45 placed in correspondence of the side of the prismatic bar 43 to which are connected the spherical ends 49 of screws 46. Transverse incisions 45 (see FIG. 3B) can open or close thus furnishing the desired elasticity to the prismatic continuous bar. In particular, in FIG. 3B, the prismatic continuous bar 43 (only the deformed part is shown and moreover with the deformation very exaggerated), has the two sections 43' and 43" in an undeformed position, i.e., they have been moved equal distances inside the cavity 44 by means of the respective screws 46. As a consequence, the transverse incision 45' is left with an undeformed width with respect to the width shown in FIG. 3a. Instead, section 43''' of prismatic bar 43 is shown in an inclined position, for which reason the incision 45" between section 43''' and the adjacent undeformed section 43" is shown as wider than the undeformed transverse incision 45'.

The section 43'''' instead, is also in an inclined position but in the sense opposite to the inclination of the adjacent section 43''', for which reason the transverse incision 45''' delimiting the two adjacent sections, is shown as being narrower with respect to the undeformed transverse incision 45'.

The leading end of the composition, once it has overcome the continuous prismatic bar 43, will continue into the slot 42 always parallel to itself, until it meets the shanks of the bolts 19 spaced apart along the width of the slot 42 and disposed all on the same straight line.

As a consequence, the front edge will meet them simultaneously. The discontinuity created by the shanks of bolts 19 in the slots 42 must not be placed too near the terminal part of the rectilineal tract of the slot, i.e., where the slot 42 links up with the short segment parallel to the extrusion direction, since the front of advancement of the compound could not, for certain particular type of compounds, have a sufficient space and time for becoming uniform again before entering into the segment of slot 42 parallel to the extrusion direction.

At the exit of this segment, where the velocity of the compound is equal along the entire advancing front, the compound enters the embedding zone 40. In fact, at this point the two streams of the compounds coming from two slots 42, must have their advancing velocities substantially equal, besides having their pressures equal all along the front of advancement, so as to meet each other and the metallic cords passing through holes 38 of the wire guide 2 without causing any disturbance in the alignment of the cords, either in the horizontal plane which contains them, or in their own vertical planes. To facilitate this, and to improve the flow of the composition between the adjacent cords, between the various exit holes 35 of the cords in the tapered end 39 of the wire guide member 2, there are present the vertical incisions 41.

In this way, embedment of the various cords in the compound is improved, since the composition can flow even into the portions between adjacent cords. Moreover, preferably, to facilitate the passage of the composition within the embedding zone 40, the speed of the cords will be slightly greater (5–10% more) than the advancing speed of the composition (taken parallel to the advancing direction of the cords themselves), so as to pull the mixture into zone 40. At this point, it will be the tapered ends 25 of the knives 24 of gauge 23 that determine the finished thickness of the conveyor belt on the basis also of the feeding speed of the mixture itself.

Also the regulation of the various knives 24 is effected on the basis of the thickness of the conveyor belt that is to be manufactured and according to the type of composition employed before starting the real and proper extrusion process.

On the finished product, i.e., on the conveyor belt that issues from the flat extruder head, can be noted, during the first phases after starting, small non-uniformities which will be eliminated by appropriate regulation only of the continuous prismatic bar 43. In fact, it has been found during tests carried out on a flat extruder head represented in FIGS. 1, 2 and 3, that the simple regulation carried out with the knife 24 of the gauge 23, do not modify in the extruded product as far as regards defects in the non-parallelism of the front of advancement of the compound, which obviously influences the parallelism and/or the coplanarity of the cords of the longitudinal resistant insert member.

These defects, and a precise regulation in general, can be eliminated only through the use of the restricting means, i.e., means for regulating the pressure placed upstream in the vicinity of the zone where the passage from the upper conduit and from the lower conduit to the corresponding slot 42 occurs.

Only with a flat extruder head, according to the present invention, can the prefixed objects be achieved.

In fact, thanks to the presence of the restricting means inside the slots that distribute the elastomeric material from the conduits, that are substantially perpendicular to the advancing direction of extrusion, to the embedding zone of the resistant insert member, any type of elastomeric material can be extruded. In fact, restricting means, in the form, for example, of a continuous prismatic bar or of a plurality of adjacent prismatic elements, succeed in equalizing the pressure drops along a general course followed by any ideal stream of compound, in this way guaranteeing a uniform pressure in any section of the slots 42 downstream of the division means. In other words, the load losses undergone by any stream of elastomeric material issuing from the extruder, are always the same whether it comes out from the flat extruder head in the zone nearest to the extruder, or in the zone that is farthest away from the extruder, and this is obtained exclusively by the regulation effected through said dividing means.

It follows, as a consequence, that the front of advancement of the composition inside slots 42, as also at the exit of the flat extruder head, will always be parallel to itself.

The parallelism of the front of advancement of the compound, particularly in the embedding zone, is fundamental since, in extruding conveyor belts for example, the resistant insert must have a well-determined position. If this position is not maintained during the extrusion, finished articles having poor characteristics are produced.

This would be the case if the front of advancement in the zone of embedment was not parallel or, worse still, if the pressures on exiting of the two streams were not equal, since, in the first case the cords would be shifted laterally in such a way as not to be parallel any longer within the conveyor belt; or, in the second case, nearer to a surface of the conveyor belt, with a finished article that no longer corresponds to the planned characteristics as required.

Moreover, thanks to the particular meeting of the two streams of elastomeric material in the embedment zone, i.e., one on one side of the longitudinal resistant insert member (cords or fabric, for example) and the other on the opposite side, there would follow that the resistant insert member could be embedded into the elastomeric material body more easily, but above all, with greater accuracy.

As a matter of fact, in those flat extruder heads in which the stream of elastomeric material reaches the zone of embedment from a single side with respect to the resistant insert member, the composition has to cross the resistant member, stressing unduly the ends of the wire guide member, and shifting also the resistant insert member with respect to its ideal position within the elastomeric body.

Moreover, with the flat extruder heads, according to the present invention, flat conveyor belts can be extruded, or other elongate articles, having widths never before obtained by any known extruder head. In fact, the flat extruder heads according to the present invention, in the particular embodiment represented in FIGS. 1 and 2, can extrude conveyor belts, or other elongate articles having a width of up to 3.5 m, while with the flat extruder heads of the type illustrated in FIGS. 4 and 5, conveyor belts or other elongate articles of up to 3 m can be extruded if used singularly, and of a practically unlimited width if more flat extruder heads are placed in parallel relationship one beside the other.

The flat extruder heads represented in FIGS. 4 and 5, can moreover, be used to embed a fabric or other elements having a web or knit structure of other structures substantially two-dimensional in an elastomeric composition with great precision with regard to the thickness of the finished article.

Moreover, because of the restricting means, the thicknesses of the extruded articles having fabrics or other elements having a web or knit structure or structures that are substantially two-dimensional embedded therein can be regulated very easily, at the limit without even interrupting their production, which instead, results in being very difficult if not impossible, with the known machines for producing an equivalent article such as, for example, calenders.

Moreover, with the flat extruder heads according to the present invention, in which the extruders are placed on opposite sides with respect to the guide element (embodiment represented in FIGS. 4 and 5 and its variations) there can be obtained in a single extrusion operation, extruded articles such as conveyor belts, for example, having different elastomeric compositions so as to furnish to each side of the extruded articles different characteristics.

This important advantage could never be obtained with the known flat extruder heads in a single operation but several operations of doubling are required with very poor results, in particular in uniformity of the thickness and the structural dimension of the finished article.

To end with, the presence of the restricting means allows the insertion of the shanks of the tie-rods, which hold together two half-bodies, in the slots because it allows regulation of the pressure of the compound.

Besides this, if by chance one or more of the tie-rods should be drawn more or less nearer each other during assembly, the two half-bodies, i.e., if in one or more zones the slots were either narrower or wider, once the flat extruder head, according to the present invention, has been assembled it will function equally because restricting means will compensate for the pressure drops upstream within the slots and, as a consequence, the front of advancement within the slots and at the exit of the flat extruder head would be parallel to itself.

Although several particular embodiments of a flat extruder head, according to this invention, have been illustrated and described, it is understood that included in the scope of this invention are all the possible variations accessible to a technician of this field.

What is claimed is:

1. An extrusion apparatus comprising an extrusion head for shaping an extrudable elastomeric composition to form an elongated band having a substantially rectangular cross-section and opposite substantially flat surfaces and at least one reinforcing member substantially completely embedded and disposed longitudinally in said band, said extrusion head comprising a shaping die having top and bottom walls and opposite side walls enclosing an opening through the die of substantially rectangular cross-section, a guide member disposed through said opening for locating said reinforcing members in the elastomeric composition as the composition is shaped to form said band, said guide member comprising a housing with top and bottom walls enclosing an open space through which the reinforcing members slide, said top and bottom walls of the guide member being disposed substantially parallel to said top and bottom walls of the die, said guide member being spaced inwardly from said top, bottom and lateral walls of the die for flow of elastomeric composition thereabout, said side walls of the die supporting said top and bottom walls of the die and said guide member in spaced relation, means operably associated with each of opposite sides of the extruder head for charging under pressure a stream of elastomeric composition into the space between the top and bottom walls of the die and against the side edges of the guide member which directs flow of elastomeric composition to opposite sides of the guide member, and means for restricting said stream prior to entrance in the die opening for flow above and below the said guide means and to enclose said reinforcing members in the resulting shaped elastomeric composition emerging from the die.

2. The apparatus of claim 1 comprising means for determining the thickness of the resulting extruded composition adjacent to the exit of the die and wherein a means for charging elastomeric compositions to the die opening is disposed on each of opposite sides of the said die opening, and means for synchronizing the said charging means whereby compositions charged from the two charging means flow into said die opening and meet near the center of the die opening above and below the guide means.

3. A flat extruder head for continuously extruding an elastomeric composition having a reinforcing member embedded therein comprising:
  a guide element wherein the reinforcing member is guided to the embedding zone,
  upper and lower body members placed on opposite sides of said guide member,
  a gauge, associated to each body member and projecting above and downstream of said guide element, in the direction of extrusion, to define in conjunction therewith said embedding zone,
  first means for maintaining said body members in contact with said guide element on opposite sides thereof and extending the entire width of said extruder head,
  a conduit in each body member, provided with at least one inlet for the elastomeric composition, said conduit being substantially perpendicular to the direction of extrusion,
  each body member having a continuous slot traversing the body member for conveying the elastomeric composition from each conduit to the embedding zone,
  second means traversing said slot for preventing the opening thereof when the elastomeric composition flows therethrough, and
  third means for restricting the flow of elastomeric composition through said slots.

4. The flat extruder head of claim 3 wherein said first means comprise two steps on opposite sides of said guide element facing each body member near the guide element end adjacent the embedding zone, a body member having a groove therein for receiving each step, and pressing means at the opposite end of said guide element pressing against said upper and lower body members, whereby said step remains blocked within said groove.

5. The flat extruder head of claim 3 wherein said second means comprise shanks of tie-rods.

6. The flat extruder head of claim 3 wherein said third means comprise a plurality of independent, adjacent prismatic elements housed inside a cavity substantially perpendicular to said slot, said elements being operable from the outside for regulating their movement out of said cavity and into said slot and vice-versa.

7. The flat extruder head of claim 3 wherein said third means comprise a continuous prismatic bar housed in a cavity substantially perpendicular to said slot, said bar being provided with transverse incisions in its greater dimension to provide elasticity, and means operable from the outside connected to the side of said bar bearing the incisions to shift or deform said bar with continuity.

* * * * *